(12) United States Patent
Friedrich

(10) Patent No.: US 11,936,662 B2
(45) Date of Patent: Mar. 19, 2024

(54) UNIFIED SECURITY REPORT AND INTERFACE WITH MULTIPLE SECURITY LAYERS

(71) Applicant: Avanan Inc., Great Neck, NY (US)

(72) Inventor: Gil Friedrich, Great Neck, NY (US)

(73) Assignee: AVANAN Inc., Great Neck, NY (US)

( * ) Notice: Subject to any disclaimer, the term of this patent is extended or adjusted under 35 U.S.C. 154(b) by 324 days.

(21) Appl. No.: 17/411,189

(22) Filed: Aug. 25, 2021

(65) Prior Publication Data

US 2022/0070180 A1  Mar. 3, 2022

Related U.S. Application Data

(60) Provisional application No. 63/070,523, filed on Aug. 26, 2020.

(51) Int. Cl.
*H04L 9/40* (2022.01)
(52) U.S. Cl.
CPC .................. *H04L 63/1408* (2013.01)
(58) Field of Classification Search
CPC ............. H04L 63/1408; H04L 63/1416; H04L 63/0428; H04L 63/1425; G06F 21/55; G06F 21/554; G06F 21/577; G06F 21/53
See application file for complete search history.

(56) References Cited

U.S. PATENT DOCUMENTS

| | | | | |
|---|---|---|---|---|
| 8,671,455 B1* | 3/2014 | Zhu | ....................... | G06F 21/554 726/26 |
| 11,089,047 B1* | 8/2021 | Kaushal | ................... | H04L 67/10 |
| 2006/0218145 A1* | 9/2006 | Butcher | ................... | G06F 21/55 |
| 2013/0061169 A1* | 3/2013 | Pearcy | .................. | G06F 11/328 715/788 |
| 2017/0185793 A1* | 6/2017 | Rotem | .................... | H04L 63/20 |

\* cited by examiner

*Primary Examiner* — Ali S Abyaneh
(74) *Attorney, Agent, or Firm* — Rivka Friedman

(57) ABSTRACT

A data security system, including a security manager computer using network application programming interface (API) calls to services that perform data exchange transactions for end users of an enterprise, and to security layers that perform preventive actions on data exchange transactions that prevent incoming and/or outgoing data exchange transactions from reaching their respective destinations, the API calls remotely monitoring the security layers to identify preventive actions on data exchange transactions performed by the security layers, wherein the security layers are provided by respective different security applications, and a data reporter operative to provide to an administrator of the enterprise a unified report of data exchange transactions that are under preventive action by at least one of the security layers, and to provide a unified interface to an end user enabling the end user to request that a preventive action applied to a selected data exchange transaction be undone.

18 Claims, 4 Drawing Sheets

```
┌─────────────────────────── 1000 ───────────────────────────┐
```

```
┌──────────────────────────────────────────────────────────┐
│  REMOTELY CONTROL ENTERPRISE SECURITY LAYERS THAT PERFORM │
│  PREVENTIVE ACTIONS ON INCOMING AND OUTGOING TRANSACTIONS │ ─ 1010
│    OF CLOUD-BASED SERVICES THAT PERFORM DATA EXCHANGE     │
│    TRANSACTIONS FOR END USERS OF AN ENTERPRISE, TO IDENTIFY│
│      PREVENTIVE ACTIONS PERFORMED BY THE SECURITY LAYERS  │
└──────────────────────────────────────────────────────────┘
                              │
                              ▼
┌──────────────────────────────────────────────────────────┐
│    PROVIDE, TO AN ADMINISTRATOR OF THE ENTERPRISE, A UNIFIED│
│     REPORT OF DATA EXCHANGE TRANSACTIONS THAT ARE UNDER    │ ─ 1020
│     PREVENTIVE ACTION BY ONE OR MORE OF THE SECURITY LAYERS│
└──────────────────────────────────────────────────────────┘
                              │
                              ▼
┌──────────────────────────────────────────────────────────┐
│  PROVIDE A UNIFIED INTERFACE ENABLING AN END USER TO REQUEST│
│     THAT AN ADMINISTRATOR UNDO A PREVENTIVE ACTION FOR A   │ ─ 1030
│           SELECTED DATA EXCHANGE TRANSACTION               │
└──────────────────────────────────────────────────────────┘
```

Admin, here is a daily summary of emails blocked across the entire organization

| Date | Inbox | Sender | Subject | Reason | Severity | Detected By | release |
|------|-------|--------|---------|--------|----------|-------------|---------|
| 1/2/202 | Ben@mycompany.com | attacker@somesite.com | change your passwo | Phishin | Critical | Avanan | ☐ |
| 1/2/202 | John@mycompany.com | sun@glasses.com | buy sunglasses | Spam | Mediu | Microsoft AT | ☐ |
| 1/2/202 | DavidB@mycompany.com | CEO@barteld.com | Invoice | Phishin | High | Microsoft AT | ☑ |
| 1/2/202 | BornJason@mycompany.c | noreply@dropPox.com | Document | High | Malwar | Avast | ☐ |
| 1/2/202 | Mj2@mycompany.com | attacker@fakedomain.c | Need a favor | Phishin | Mediu | Check Point | ☑ |
| 1/2/202 | WayneJ@mycompany.com | Justin@deals.com | Try this today! | Spam | Low | Microsoft AT | ☐ |
| 1/2/202 | WebberH@mycompany.co | system@office365.con | Quota expired | Phishin | Critical | Avanan | ☐ |
| 1/2/202 | VarkerD@mycompany.com | ray@ban.com | Rayban today! | Spam | Mediu | Avanan | ☑ |

Submit

FIG. 3

UNIFIED SECURITY REPORT AND INTERFACE WITH MULTIPLE SECURITY LAYERS

PRIORITY REFERENCE TO PROVISIONAL APPLICATIONS

This application is a non-provisional of U.S. Provisional Application No. 63/070,523, entitled UNIFIED SECURITY REPORT AND INTERFACE WITH MULTIPLE SECURITY LAYERS, and filed on Aug. 26, 2020 by inventor Gil Friedrich, the contents of which are hereby incorporated herein in their entirety.

FIELD OF THE INVENTION

The present invention relates to data security for data exchange services.

BACKGROUND OF THE INVENTION

Enterprises often employ more than one layer of security to protect themselves against malware and data leaks. E.g., an enterprise using Microsoft Office 365 and third-party security providers, has a first security layer provided by Office 365, and additional security layers provided by the third parties. Each security layer takes preventive actions including quarantining incoming or outgoing malicious or suspicious e-mails, and other forms of data exchange. Each security layer generates its own digest or report of the objects that the security later has quarantined, for an IT administrator of the enterprise; and each security layer enables the IT administrator to release objects from quarantine, as appropriate based on the security risk.

A disadvantage of multiple security layers is the multiple digests or reports that an IT administrator needs to review on a daily or even hourly basis. Moreover, if an end user contacts an IT administrator regarding an important e-mail that he is expecting which hasn't yet arrived, the IT administrator needs to search each digest or report provided by the various security layers to identify the specific security layer that quarantined the e-mail, and then instruct that security layer to release the e-mail.

It would thus be of advantage to have a unified reporting and releasing mechanism that enables end users/IT administrators to see their/all quarantined objects in a single glance, and to request release of/release selected objects from quarantine using a single interface.

SUMMARY

Embodiments of the present invention provide systems and methods for integrating reports or digests provided by multiple security layers into a single unified report, and for providing a unified interface for releasing objects from quarantine regardless of which security layer quarantined the object. These embodiments obviate the need for an IT administrator to deal with multiple security digests or reports.

There is thus provided in accordance with an embodiment of the present invention a data security system, including a security manager computer using network application programming interface calls to services that perform data exchange transactions for end users of an enterprise, and to security layers that perform preventive actions on data exchange transactions that prevent incoming and/or outgoing data exchange transactions from reaching their respective destinations, the API calls remotely monitoring the security layers to identify preventive actions on data exchange transactions performed by the security layers, wherein the security layers are provided by respective different security applications, and a data reporter operative to provide to an administrator of the enterprise a unified report of data exchange transactions that are under preventive action by at least one of the security layers, enabling the administrator to undo preventive actions applied to one or more selected data exchange transactions, regardless of which security layer(s) applied the preventive actions, and to provide a unified interface to an end user enabling the end user to request from the administrator that preventive actions applied to one or more selected ones of the end user's data exchange transactions be undone, regardless of which security layer(s) applied the preventive actions.

There is additionally provided in accordance with an embodiment of the present invention a data security method, including remotely controlling, via network application programming interface calls, (i) enterprise services that perform data exchange transactions for end users, and (ii) enterprise security layers that apply preventive actions to data exchange transactions that prevent incoming and/or outgoing data exchange transactions from reaching their respective destinations, to identify preventive actions performed by the security layers on data exchange transactions, wherein the security layers are provided by respective different security applications, providing, to an administrator of the enterprise, a unified report of data exchange transactions that are under a prevention action by at least one of the security layers, enabling the administrator to undo preventive actions for one or more selected data exchange transaction, regardless of which security layer(s) applied the preventive actions, and providing a unified interface to an end user, enabling the end user to request from the administrator that preventive actions applied to one or more selected ones of the end user's data exchange transaction be undone, regardless of which security layer(s) applied the preventive actions.

BRIEF DESCRIPTION OF THE DRAWINGS

The present invention will be more fully understood and appreciated from the following detailed description, taken in conjunction with the drawings in which:

FIG. 3 is a simplified unified report of data exchange transactions currently under preventive action, generated by the data reporter of FIG. 1, in accordance with an embodiment of the present invention.

For reference to the figures, TABLE I below provides an index of elements and their numerals. Similarly numbered elements represent elements of the same type, but they need not be identical elements.

TABLE I

Elements in the figures

| Element | Description |
|---|---|
| 100 | cloud computing center |
| 110 | end user computing devices communicating with cloud computing center |
| 120, 130 | cloud-based data transaction exchange services cloud-based security layers |
| 200 | cloud security platform |
| 210 | security manager |
| 220 | data reporter |
| 230 | security layer |
| 300 | integrated report showing quarantined data exchange transaction by various security layers |
| 301-308 | table fields |
| 400 | interface for releasing data exchange transactions from quarantine |
| 401-406 | table fields |

Elements numbered in the 1000's are operations of flow charts.

DETAILED DESCRIPTION

In accordance with embodiments of the present invention, security systems and methods are provided for a unified reporting and releasing mechanism that enables end users/IT administrators to see their/all quarantined objects in a single glance, and to request release of/release selected objects from quarantine using a single interface. These embodiments merge security alerts from multiple e-mail security layers into a single admin dashboard and a single end-user daily digest.

Figure 1:
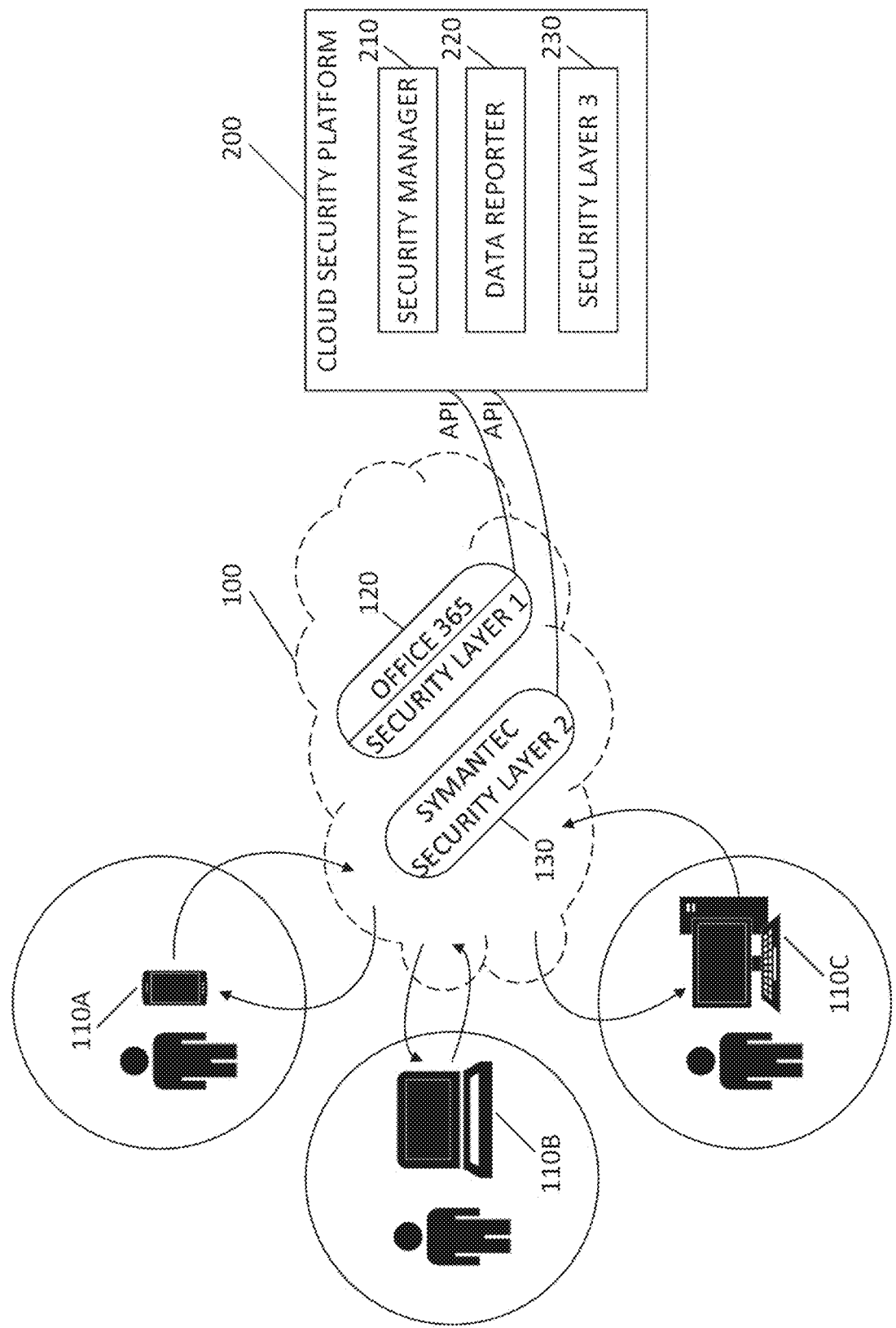
FIG. 1 is a simplified block diagram of an enterprise data security system, in accordance with an embodiment of the present invention.

Reference is made to FIG. 1, which is a simplified block diagram of an enterprise data security system, in accordance with an embodiment of the present invention. Shown in FIG. 1 is an enterprise network that deploys cloud 100 services. FIG. 1 shows respective enterprise employees using cloud 100 services via a desktop computer 110A, a laptop computer 110B, and a smartphone 110C. Cloud 100 services include services for data exchange transactions provided by applications such as OFFICE 365® 120, developed by Microsoft Corporation of Redmond, Wash. Cloud 100 services also include security layers provided by various third-party applications, such as SYMANTEC® 130 Cyber Security provided by Symantec Corporation of Mountain View, Calif. OFFICE 365 120 includes its own security layer.

The security layers perform preventive actions on data exchange transactions that prevent incoming and/or outgoing data exchange transactions from reaching their respective destinations. The preventive actions include inter alia quarantining a data exchange transaction, locking a data exchange transaction, encrypting a data exchange transaction, modifying a data exchange transaction, and removing one or more attachments from a data exchange transaction.

FIG. 1 also shows a cloud security platform 200, which includes a security manager 210, a data reporter 220, and a security layer 230 for monitoring incoming and outgoing data exchange transactions for service 120. Operation of security manager 210 and data reporter 220 is described in detail below with reference to the flowchart of FIG. 2, the unified report of FIG. 3, and the unified interface of FIG. 4. Security layer 230 may be an AVANAN™ security layer, developed by Avanan, Inc. of Great Neck, N.Y. Operation of security layer 230 is described in applicant's U.S. Pat. Nos. 10,372,931 and 10,509,917.

Briefly, security manager 210 uses network application programming interface (API) calls to service 120 and to security layer 130, to remotely monitor the security layers to identify preventive actions on data exchange transactions performed by the security layers. Data reporter 220 merges security alerts from multiple e-mail security layers into a single admin dashboard and a single end-user daily digest. Specifically, data reporter 220 provides to an IT administrator a unified report of the data exchange transactions that are currently under preventive action by at least one of the security layers and/or by security layer 230, and provides to an end user a unified interface enabling the end user to request from an IT administrator that preventive actions for selected ones of his data exchange transactions be undone, so that the selected incoming data exchange transactions may reach the end user, and the selected outgoing data transactions may reach their respective destinations, regardless of which security layer(s) prevented the selected data exchange transaction(s) from reaching the end user/their respective destinations.

It will be appreciated by those skilled in the art that embodiments of the present invention apply also to enterprise services and security layers that are not cloud-based, but are instead installed locally within the enterprise.

Figure 2:
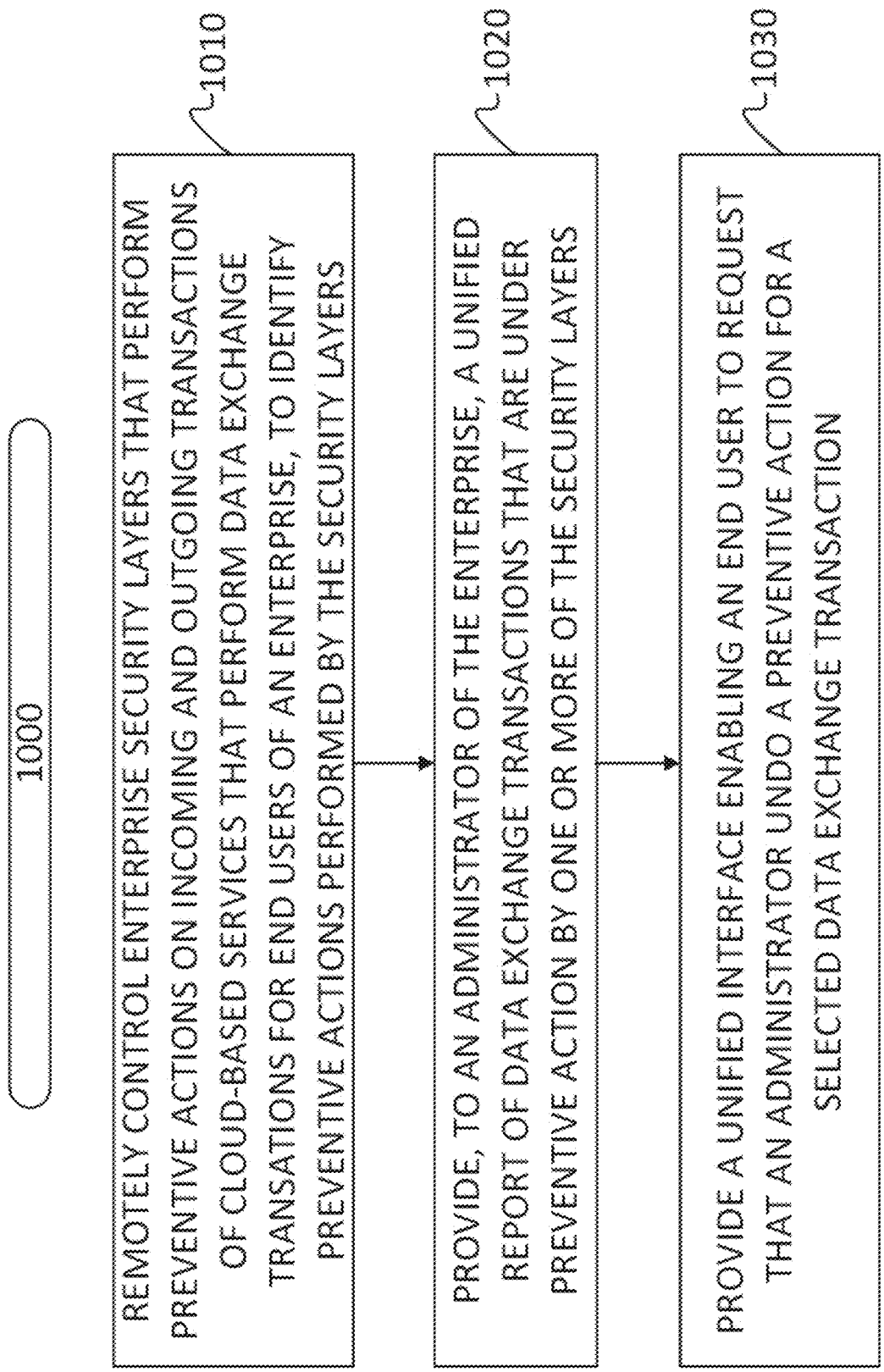
FIG. 2 is a simplified flowchart of an enterprise data security method, in accordance with an embodiment of the present invention.

Reference is made to FIG. 2, which is a simplified flowchart 1000 of an enterprise data security method, in accordance with an embodiment of the present invention. At operation 1010 security manager 210 remotely controls, via network API calls, service 120 and security layer 130, to identify preventive actions performed by the security layers on data exchange transactions. At operation 1020 data reporter 220 provides to an IT administrator a unified report of data exchange transactions that are under a preventive action by at least one of the security layers 120, 130 and 230. At operation 1030 data reporter 220 provides to an end user a unified interface enabling the end user to request from an IT administrator that preventive actions for one or more of his selected data exchange transactions be undone, so that the selected incoming data exchange transactions may reach the end user, and the selected outgoing data transactions may reach their respective destinations, regardless of which security layer(s) prevented the selected data exchange transaction(s) from reaching the end user/their respective destinations.

Reference is made to FIG. 3, which is a simplified unified report 300 of data exchange transactions currently under preventive action, generated by data reporter 220, in accordance with an embodiment of the present invention. Unified report 300 is provided to an IT administrator, and summarizes incoming and outgoing data exchange transactions that were blocked during a specific time interval, such as on Jan. 2, 2020.

User interface 300 is in tabular form with a field 301 for a date on which a preventive action was applied to a data exchange transaction, a field 302 for a destination inbox, a field 303 for a sender from which the data exchange transaction originated, a field 304 for a subject of the data exchange transaction, a field 305 for a security-based reason, such as the name of a discovered virus, that the preventive action was applied to the data exchange transaction, a field 306 for severity of the security threat, a field 307 for the security layer that performed the preventive action, and a field 308 enabling the IT administrator to undo selected ones of the preventive actions.

Figure 4:
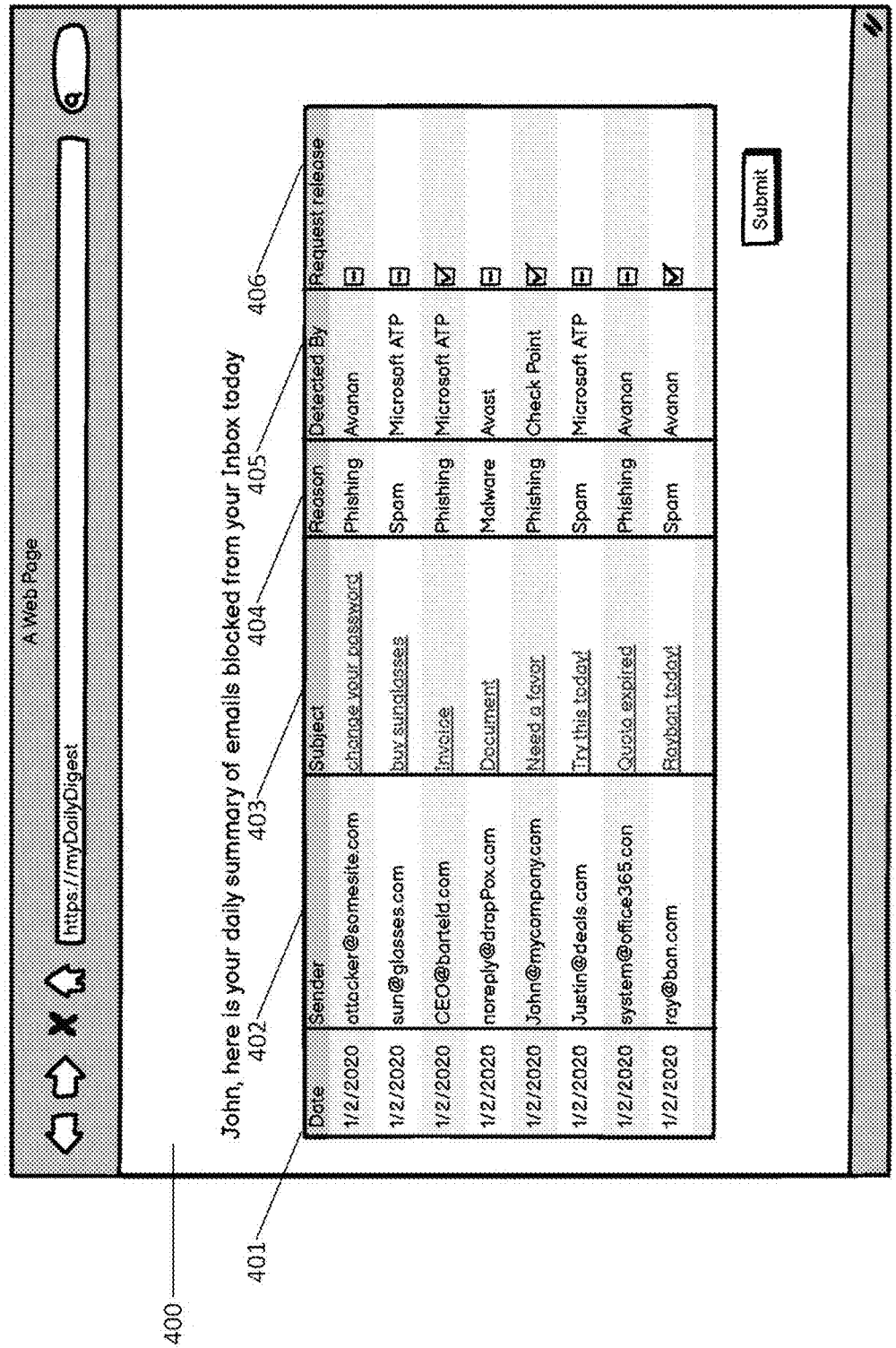
FIG. 4 is a simplified drawing of a user interface provided by the data reporter of FIG. 1, enabling an end user to request from an IT administrator that preventive actions that were applied to selected ones of his data exchange transactions of undone, in accordance with an embodiment of the present invention.

Reference is made to FIG. 4, which is a simplified drawing of a user interface 400 provided by data reporter 220. User interface 400 is provided to an end user, John, and summarizes John's incoming data exchange transactions that were blocked on a specific date; namely, Jan. 2, 2020. User interface 400 enables John to request from an IT administrator that preventive actions that were applied to one or more selected ones of John's data exchange transactions be released, or undone, in accordance with an embodiment of the present invention. User interface 400 is in tabular form with a field 401 for a date on which a preventive action was applied to an incoming data exchange transaction, a field 402 for a sender from which the data exchange transaction originated, a field 403 for a subject of the data exchange transaction, a field 404 for a security-based reason that the preventive action was applied to the incoming data exchange transaction, a field 405 for the security layer that performed the preventive action, and a field 406 with a checkbox enabling John to request that an IT administrator release, or undo, one or more preventive actions applied to John's data exchange transactions.

It will thus be appreciated that embodiments of the present invention offer many advantages for managing enterprise security when several security layers are operative. In particular, these advantages include the capability for an end user (i) to discover what happened to a data exchange transaction of his, (ii) to view his/her data exchange transactions that are under a preventive action and the security layer(s) that applied the preventive actions and the reason(s) therefor, and (iii) to request that a preventive action applied to the data exchange transaction be undone, regardless of which security layer applied the preventive action. These embodiments also include the capability for an IT administrator (iv) to view preventive actions applied to data exchange transactions by any of the security layers and the reasons therefor, (v) to receive requests from end users to undo preventive actions, and, in response, (vi) to undo or not undo the requested preventive actions, as appropriate, regardless of which security layer applied the preventive actions.

Implementation Details

Regarding the OFFICE 365 110 security layer, for some embodiments of the present invention, security manager 210 connects with the Microsoft Graph Security API either directly using supported integration options, or using native integrations and connectors built by Microsoft, including inter alia Security Incident and Management (SIEM), Security Orchestration and Response (SOAR), and Incident Tracking and Service Management (ITSM), as per TABLE II below, or using native integrations and connectors built by Microsoft partners. Microsoft Graph Security API is a set of APIs that allow third-parties to receive security events from Microsoft—in case something was blocked.

TABLE II

Microsoft Connectors
(from https://docs.microsoft.com/en-us/graph/security-integration)

| Solution Type | Name | Connector |
|---|---|---|
| SIEM | Splunk Enterprise and Splunk Cloud | Microsoft Graph Security API for Splunk |
| SIEM | QRadar | Microsoft Graph Security API Protocol and supported QRadar DSMs |
| ITSM | ServiceNow | Microsoft Graph Security API alert ingestion integration |
| SOAR | Azure Logic Apps/ Microsoft Flow | Microsoft Graph Security connector for Azure Logic Apps Microsoft Flow and Power Apps |
| Automation | PowerShell Module | Microsoft Graph Security PowerShell Module |
| Reporting | Power BI | Microsoft Graph Security connector for PowerBI |

For some embodiments of the present invention, SIEM integration is used. STEM integration enables an administrator to view information, such as malware or phishing, detected by Office 365 Advanced Protection, in STEM server reports. The STEM server or other similar system polls the audit.generai workload to access detection events. TABLE III below shows values of AuditLogRecordType that are relevant for Office 365 Advanced Threat Protection (ATP) events.

TABLE III

AuditLogRecordType
(from https://docs.microsoft.com/en-us/microsoft-365/security/office-365-security/siem-integration-with-office-365-ti?view=o365-worldwide)

| Value | Member Name | Description |
|---|---|---|
| 28 | ThreatIntelligence | Phishing and malware events from Exchange Online Protection and Office 365 Advanced Threat Protection. |
| 41 | ThreatIntelligenceUr | TP Safe Links time-of-block and block override events from Office 365 Advanced Threat Protection. |
| 47 | ThreatIntelligenceAtpContent | Phishing and malware events for files in Sharepoint Online, OneDrive for Business, and Microsoft Teams from Office 365 Advanced Threat Protection. |
| 64 | AirInvestigation | Automated Investigation and response events, such as investigation details and relevant artifacts from Office 365 Advanced Threat Protection Plan 2. |

Below are examples of Release-Quarantine Message program code, from https://docs.microsoft.com/en-us/powershell/module/exchange/release-quarantinemessage?view=exchange-ps.

```
Release-QuarantineMessage
   [—Identities <QuarantineMessageIdentity[ ]>]
   [—Identity <QuarantineMessageIdentity>]
   —User <String[ ]>
   [—AllowSender]
   [—Confirm]
   [—Force]
   [—ReportFalsePositive]
   [—WhatIf]
   [<CommonParameters>]
Release-QuarantineMessage
   [—Identities <QuarantineMessageIdentity[ ]>]
   [—Identity <QuarantineMessageIdentity>]
   [—ReleaseToAll]
   [—AllowSender]
   [—Confirm]
   [—Delete]
   [—Force]
   [—ReportFalsePositive]
```

```
[—WhatIf]
[<CommonParameters>]
Release-QuarantineMessage
    —Identities <QuarantineMessageIdentity[ ]>
    [—Identity <QuarantineMessageIdentity>]
    [—AllowSender]
    [—Confirm]
    [—Force]
    [—ReportFalsePositive]
    [—WhatIf]
    [<CommonParameters>]
Release-QuarantineMessage
    —Identity <QuarantineMessageIdentity>
    [—AllowSender]
    [—Confirm]
    [—Force]
    [—ReportFalsePositive]
    [—WhatIf]
    [<CommonParameters>]
```

The following example uses the Get-QuarantineMessage cmdlet to release the quarantined message with the Message-ID value 5c695d7e-6642-4681-a4b0-9e7a86613cb7@contoso.com to an original recipient julia@contoso.com.

Get-QuarantineMessage —MessageID "<5c695d7e-6642-4681-a4b0-9e7a86613cb7@contoso.com>" | Release-QuarantineMessage —User julia@contoso.com The following example releases the quarantined message with the specified Identity value to all original recipients.

Release-QuarantineMessage —Identity c14401cf-aa9a-465b-cfd5-08d0f0ca37c5\4c2ca98e-94ea-db3a-7eb8-3b63657d4db7 —ReleaseToAll The following example releases all messages to all original recipients.

Get-QuarantineMessage | Release-QuarantineMessage —ReleaseToAll

The following example releases a file that was quarantined as part of Office 365 Advanced Threat Protection. The first command stores all SharePoint Online, OneDrive for Business and Microsoft Teams quarantined files in the variable $q. The second command releases the last file in the list.

$q=Get-QuarantineMessage —QuarantineTypes SPOMalware;
$q[−1] | Release-QuarantineMessage —ReleaseToAll In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A data security system, comprising:
    a security manager computer using network application programming interface (API) calls to services that perform data exchange transactions for end users of an enterprise, and to a plurality of security layers that perform preventive actions on data exchange transactions that prevent incoming and/or outgoing data exchange transactions from reaching their respective destinations, the API calls remotely monitoring the security layers to identify preventive actions on data exchange transactions performed by the security layers, wherein the plurality of security layers includes at least a first security layer and a second security layer, the first security layer provided by a security application of one of the services that performs the data exchange transactions, and the second security layer provided by a security application that is separate from the services that perform the data exchange transactions, and wherein the plurality of security layers are provided by respective different security applications; and
    a data reporter operative to provide to an administrator of the enterprise a unified report of data exchange transactions that are under preventive action by at least one of the security layers, enabling the administrator to undo preventive actions applied to one or more selected data exchange transactions, regardless of which security layer or layers of the plurality of security layers applied the preventive actions, and to provide a unified interface to an end user enabling the end user to request from the administrator that preventive actions applied to one or more selected ones of the end user's data exchange transactions be undone, regardless of which security layer or layers of the plurality of security layers applied the preventive actions.

2. The data security system of claim 1, wherein the preventive actions performed by the plurality of security layers on a data exchange transaction comprise quarantining the data exchange transaction, locking the data exchange transaction, encrypting the data exchange transaction, modifying the data exchange transaction, and removing one or more attachments from the data exchange transaction.

3. The data security system of claim 1, wherein at least one of the enterprise data exchange services is a cloud-based service.

4. The data security system of claim 1, wherein at least one security layer of the plurality of security layers is a cloud-based layer.

5. The data security system of claim 1, wherein the unified report comprises data exchange transactions for end users of the enterprise that are under preventive action by at least one security layer of the plurality of security layers, during a specific time period.

6. The data security system of claim 1, wherein the unified report comprises incoming data exchange transactions that are under preventive action by at least one security layer of the plurality of security layers.

7. The data security system of claim 1, wherein the unified report comprises outgoing data exchange transactions that are under preventive action by at least one security layer of the plurality of security layers.

8. The data security system of claim 1, wherein the unified interface transmits the end user's request to the administrator.

9. The data security system of claim 1, wherein the unified interface enables the end user to request from the administrator that a preventive action applied to a selected data exchange transaction be undone, so that the selected data exchange transaction may reach the end user, regardless of which security layer of the plurality of security layers prevented the selected data exchange transaction from reaching the end user.

10. A data security method, comprising:
    remotely controlling, via network application programming interface (API) calls, (i) enterprise services that perform data exchange transactions for end users, and (ii) a plurality of security layers that apply preventive actions to data exchange transactions that prevent incoming and/or outgoing data exchange transactions from reaching their respective destinations, to identify preventive actions performed by the security layers on data exchange transactions, wherein the plurality of security layers includes at least a first security layer and a second security layer, the first security layer provided by a security application of one of the services that performs the data exchange transactions, and the second security layer provided by a security application that is separate from the services that perform the data exchange transactions, and wherein the plurality of security layers are provided by respective different security applications;

providing, to an administrator of the enterprise, a unified report of data exchange transactions that are under a prevention action by at least one of the security layers, enabling the administrator to undo preventive actions for one or more selected data exchange transaction, regardless of which security layer or layers of the plurality of security layers applied the preventive actions; and providing a unified interface to an end user, enabling the end user to request from the administrator that preventive actions applied to one or more selected ones of the end user's data exchange transaction be undone, regardless of which security layer or layers of the plurality of security layers applied the preventive actions.

11. The data security method of claim 10, wherein the preventive actions performed by the plurality of security layers on a data exchange transaction comprise quarantining the data exchange transaction, locking the data exchange transaction, encrypting the data exchange transaction, modifying the data exchange transaction, and removing one or more attachments from the data exchange transaction.

12. The data security method of claim 10, wherein at least one of the enterprise data exchange services is a cloud-based service.

13. The data security method of claim 10, wherein at least one security layer of the plurality of security layers is a cloud-based layer.

14. The data security method of claim 10, wherein the unified report comprises data exchange transactions for end users of the enterprise that are under preventive action by at least one security layer of the plurality of security layers, during a specific time period.

15. The data security system of claim 10, wherein the unified report comprises incoming data exchange transactions that are under preventive action by at least one security layer of the plurality of security layers.

16. The data security system of claim 10, wherein the unified report comprises outgoing data exchange transactions that are under preventive action by at least one security layer of the plurality of security layers.

17. The data security method of claim 10, further comprising transmitting the end user's request to the administrator.

18. The data security method of claim 10, wherein said providing a unified interface enables the end user to request that a preventive action applied to a selected data exchange transaction be undone, so that the selected data exchange transaction may reach the end user, regardless of which security layer of the plurality of security layers prevented the selected data exchange transaction from reaching the end user.

* * * * *